US008527116B2

(12) United States Patent  (10) Patent No.: US 8,527,116 B2
Ezerzere et al.  (45) Date of Patent: Sep. 3, 2013

(54) PROCESS AND DEVICE FOR OPTIMISING THE PERFORMANCE OF AN AIRCRAFT IN THE PRESENCE OF A LATERAL DISSYMMETRY

(75) Inventors: Pierre Ezerzere, Toulouse (FR); Stéphane Puig, Lauzerville (FR); Fabien Calderara, Cugnaux (FR)

(73) Assignee: Airbus Operations (SAS) of Toulouse (FR)

( * ) Notice: Subject to any disclaimer, the term of this patent is extended or adjusted under 35 U.S.C. 154(b) by 293 days.

(21) Appl. No.: 12/780,669

(22) Filed: May 14, 2010

(65) Prior Publication Data

US 2011/0046823 A1 Feb. 24, 2011

(30) Foreign Application Priority Data

May 18, 2009 (FR) ...................................... 09 02376

(51) Int. Cl.
*G05D 1/00* (2006.01)
*G05D 1/08* (2006.01)
*B64C 5/06* (2006.01)
*B64C 17/00* (2006.01)

(52) U.S. Cl.
USPC .......... 701/4; 701/3; 244/91; 244/92; 244/93; 244/34 R

(58) Field of Classification Search
USPC ...................... 701/4, 9; 244/91–93, 34 R–39
See application file for complete search history.

(56) References Cited

U.S. PATENT DOCUMENTS

| 4,964,599 | A | 10/1990 | Farineau |
| 5,170,969 | A | 12/1992 | Lin |
| 6,561,020 | B2 * | 5/2003 | Glenney ..................... 73/170.02 |
| 2002/0169526 | A1 | 11/2002 | Alwin et al. |
| 2008/0133069 | A1 * | 6/2008 | Morales De La Rica et al. ................. 701/4 |
| 2009/0005919 | A1 * | 1/2009 | Boe et al. ......................... 701/9 |
| 2011/0184623 | A1 | 7/2011 | De Boer |

FOREIGN PATENT DOCUMENTS

WO WO 2007/019135 2/2007

OTHER PUBLICATIONS

Non Final Office Action mailed Aug. 24, 2012 in U.S. Appl. No. 12/780,577 (4).

* cited by examiner

*Primary Examiner* — Helal A Algahaim
*Assistant Examiner* — Thomas Ingram
(74) *Attorney, Agent, or Firm* — Novak Druce Connolly Bove + Quigg LLP

(57) ABSTRACT

A process and device for optimising the performance of an aircraft in the presence of a lateral dissymmetry is disclosed. The device (1) includes means (2, 3, 4, 5, 7, 9) for controlling, during a lateral dissymmetry, at least one rudder such as to generate an optimum sideslip for reducing the drag of the aircraft.

6 Claims, 2 Drawing Sheets

PROCESS AND DEVICE FOR OPTIMISING THE PERFORMANCE OF AN AIRCRAFT IN THE PRESENCE OF A LATERAL DISSYMMETRY

CROSS-REFERENCE TO RELATED APPLICATIONS

This application claims priority to French Patent Application 0902376, filed May 18, 2009, the contents of which are incorporated herein by reference.

FIELD OF THE INVENTION

This invention relates to a process and a device for optimising the performance of an aircraft in the presence of a lateral dissymmetry.

BACKGROUND OF THE INVENTION

It is noted some types of breakdowns on an aircraft, such as undesired movements of control surfaces, incorrect lateral centering, undesired extension of thrust reversers or outside conditions such that a frost accretion difference between right wing and left wing can generate a lateral dissymmetry of the aircraft. Bilateral dissymmetry, it is meant that the default of symmetry between right side and left side of the aircraft, with respect to the median vertical plan of said aircraft.

Such a lateral dissymmetry results in the following effects on the behaviour of an aircraft, in particular a cargo aircraft:
 - it generates a roll movement which is generally compensated for by control surfaces of the roll axis (ailerons and spoilers); and
 - it generates a yaw movement which is generally compensated for by control surfaces of the yaw axis (the rudder unit).

The direction and magnitude of such movements depend on the side of dissymmetry and the type of breakdowns or the outside environmental conditions at the origin of such dissymmetry.

Such dissymmetry is generally compensated for, during a flight, either automatically by an auto-flight device of the aircraft, or manually by a pilot using means for controlling the control surfaces. These actions aim at ensuring some stability to the aircraft and some comfort for passengers. The response of the aircraft to a dissymmetry therefore results in control surface deflections. These control surface deflections generate an additional drag which is proportional to the nature and the level of the dissymmetry to be corrected and which leads to an increase of fuel consumption.

This phenomenon, when maintained for a significant time, leads to a fuel overconsumption and then reduces, in particular, the security margins in term of accessible distance for the aircraft.

Solutions are currently known for treating particular breakdowns generating a lateral dissymmetry, for example engine breakdowns. However, these usual solutions are only adapted to these particular breakdowns for which they were designed.

In addition, they can generate new negative effects required to be overcome. As an illustration, a breakdown of one or more engines located on a same side of an aircraft generates, firstly, a high yaw moment. The latter is mainly compensated for by deflecting the rudder. Yet, such deflection induces, in turn, a roll moment which adds to the effect of the breakdown.

Besides, from document WO-2007/019135, an automated system is known, which detects and records factors influencing the fuel consumption of an aircraft. This system provides detecting and recording configuration factors (such as the engine(s) effectively used on the airplane, the weight, the weight distribution, the engine pressure and the rotation speeds of the engine), environmental factors (such as wind speed and direction, temperature, altitude and air pressure), and flight path factors (such as the effectively travel route, travel distance, and take-off/landing conditions for airports). Functions of this system are the following:
 - using the obtained data for standardizing the fuel efficiency of each aircraft and engine;
 - using the standardizing data for an aircraft and engine fleet of an airline, in order to find the optimum aircraft/engine combinations for the routes traveled by the airline; and
 - sending, from the aircraft, the data collected during a flight or a notification message to a computer system of the airline, in order to download the collected data from the aircraft upon the following landing.

SUMMARY OF THE INVENTION

This invention relates to a process for optimising the performance of an aircraft in the presence of a lateral dissymmetry, which enables to overcome the above mentioned drawbacks.

For that purpose, according to the invention, said process is remarkable in that during a flight of the aircraft, automatically:
 a) said aircraft is monitored such that a lateral dissymmetry can be detected;
 b) when a lateral dissymmetry is detected, after the aircraft is at equilibrium, flight parameters of the aircraft are measured, on the one hand, and on the other hand, the positions of the control surfaces used for minimising the effects of the lateral dissymmetry are measured by generating a null sideslip of the aircraft;
 c) using said measured flight parameters, aerodynamic coefficients relating to said control surfaces are calculated;
 d) using said calculated aerodynamic coefficients and said measured positions of the control surfaces, an optimum sideslip for minimising the overall drag coefficient of the aircraft is calculated;
 e) commands are determined for controlling at least one rudder for generating said optimum sideslip, when they are applied to said rudder; and
 f) said commands are applied to said rudder.

Thus, with the invention, commands are determined and applied to an aircraft, in particular a cargo aircraft, for obtaining an optimum sideslip which is defined such that the overall drag coefficient of aircraft is minimised. Accordingly, by reducing the overall drag coefficient, the instant fuel consumption is reduced and therefore, the performance of the aircraft is increased. In particular, the security margins in terms of accessible distance by the aircraft with a dissymmetry are increased.

According to the invention, said optimum sideslip is calculated such that the deflection of the roll axis control surfaces, mainly the spoilers and optionally the ailerons of an aircraft, is reduced, even cancelled if possible. According to the invention, a sideslip is generated which, by known aerodynamic effects, generates a roll moment which is capable of compensating for the roll generating by dissymmetry. Since the rudder generates a drag which is less than the one generated by the control surfaces of the roll axis, the drag is therefore reduced such that the overall drag coefficient of the aircraft is minimised.

In a preferred embodiment, in step d), said optimum sideslip $\beta op$ is calculated using the following expression:

$$\beta op=-(C\lambda\delta p1\cdot\delta p1+C\lambda\delta r\cdot\delta r+C\lambda\delta p2\cdot\delta p2)/C\lambda\beta$$

wherein:
- $\delta p1$ and $\delta p2$ are the equilibrium positions of roll control surfaces of the aircraft, for example ailerons and spoilers;
- $\delta r$ is the equilibrium position of a rudder of the aircraft;
- $C\lambda\delta p1$, $C\lambda\delta p2$ and $C\lambda\delta r$ are the aerodynamic coefficients relating respectively to the roll control surfaces and the rudder; and
- $C\lambda\beta$ is the derivative of the roll moment coefficient with respect to the sideslip.

Besides, in a particular embodiment, in step e), first commands for controlling the rudder and second commands for controlling the thrust of the engines of the aircraft are determined, said first and second commands enabling said optimum sideslip $\beta op$ to be generated when they are applied together to the aircraft, and in step b), said first and second commands are respectively applied to said rudder and to said engines.

In this particular embodiment, advantageously, said second commands are determined using said optimum sideslip $\beta op$ and a thrust optimisation table indicative, for any sideslip value, of an associated thrust value. Said second commands are determined such as to generate the thrust value from said thrust optimisation, which is associated with said optimum sideslip.

Further, advantageously, said thrust optimisation table is determined, in a preliminary step (at ground) before the flight, using usual simulations.

In the above-mentioned particular embodiment, an optimum sideslip is therefore generated by the combined action of the rudder and differential engine thrusts. In this case, the following are preferably ensured:
- an overall thrust level, equivalent to that existing before the differential thrust according to the invention is generated;
- limited thrusts in order to avoid vibrations; and
- an optimum fuel consumption.

Using different differential engine thrusts (that is different thrusts according to both sides) enables the deflections of the rudder to be limited, which limits the effects thereof on the drag and therefore further reduces the fuel consumption.

This invention also relates to a method for correcting a lateral dissymmetry of an aircraft. This method is of the type comprising a main step of bringing the control surfaces of the aircraft to positions for generating a null sideslip of the aircraft.

According to the invention, said main step and the above-mentioned process (for optimising the performance of an aircraft) are implemented together, said main step being implemented between steps a) and b) of said process.

This invention also relates to a device for optimising the performance of an aircraft in the presence of lateral dissymmetry.

According to the invention, said device is remarkable in that it includes:
- first means for automatically monitoring said aircraft such that a lateral dissymmetry can be detected;
- second means for automatically measuring, when a lateral dissymmetry is detected, on the one hand, flight parameters of the aircraft, likely to be affected by the lateral dissymmetry of the aircraft, and on the other hand, the positions of said control surfaces used for minimising the effects of the lateral dissymmetry by generating a null sideslip;
- third means for automatically calculating, using said measured flight parameters, aerodynamic coefficients relating to said control surfaces;
- fourth means for automatically calculating, using said calculated aerodynamic coefficients and said measured positions of the control surfaces, an optimum sideslip for minimising the overall drag coefficient of the aircraft;
- fifth means for automatically determining commands for controlling at least one rudder for generating said optimum sideslip, when they are applied to said rudder; and
- sixth means for automatically applying said commands to said rudder.

In a particular embodiment:
- said fifth means are formed such that first commands for controlling the rudder and second commands for controlling the thrust of the engines of the aircraft are determined, said first and second commands enabling said optimum sideslip to be generated when they are applied together to the aircraft; and
- said sixth means are formed such that said first and second commands are applied respectively to said rudder and to said engines.

The device in accordance with the invention is therefore an on board device for optimising, in real-time and in a long term, the control of the aircraft in order to minimise the effects of a lateral dissymmetry, particularly in terms of performance.

This invention also relates to a system for correcting a lateral dissymmetry of an aircraft which includes, in addition to the above-mentioned optimisation device, means for bringing the control surfaces to positions for generating a null sideslip of the aircraft. The optimisation device in accordance with the invention enables this correction system to be improved.

This invention further relates to an aircraft, particularly a cargo aircraft, which includes a device for optimising the performance of an aircraft and/or a correction system, such as the ones mentioned above.

BRIEF DESCRIPTION OF THE DRAWINGS

The figures of the appended drawing will help better understand how the invention can be implemented. In these figures, identical references refer to similar elements.

DETAILED DESCRIPTION

Figure 1:
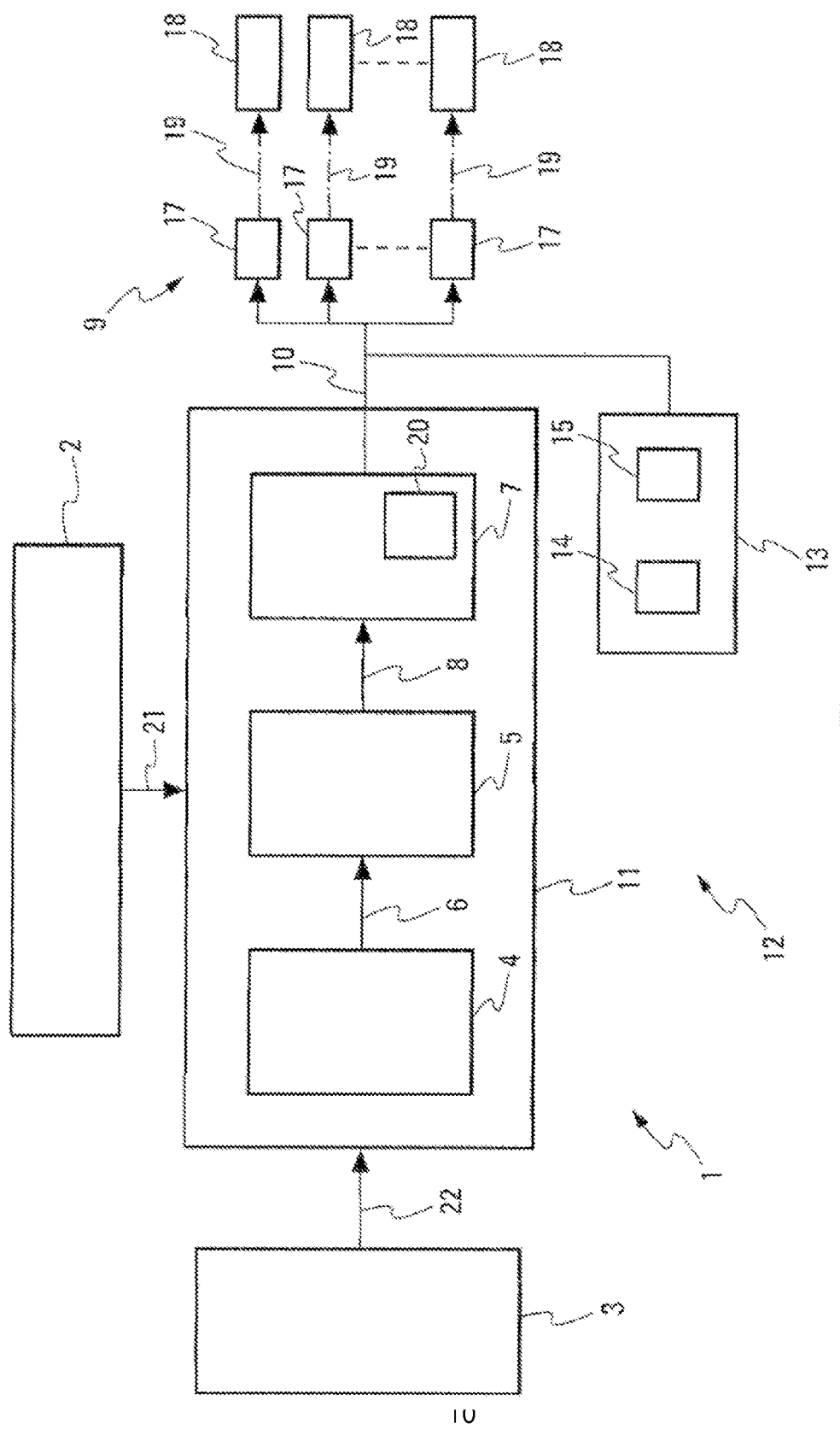
FIG. 1 is an block diagram of a device in accordance with the invention for optimising the performance of an aircraft.

The device 1 in accordance with the invention and schematically depicted in FIG. 1 is intended to optimise the performance of an aircraft A, in particular a cargo aircraft, when a lateral dissymmetry occurs on this aircraft A. A lateral dissymmetry is a symmetry defect between right side and left side of said aircraft A with respect to the median vertical plane thereof (which is, in the case of an aircraft, the plane perpendicular to the average plane of the wings, intersecting the longitudinal axis thereof). A lateral dissymmetry can in particular be generated by breakdowns during the flight or changes in the environmental conditions.

Figure 2:
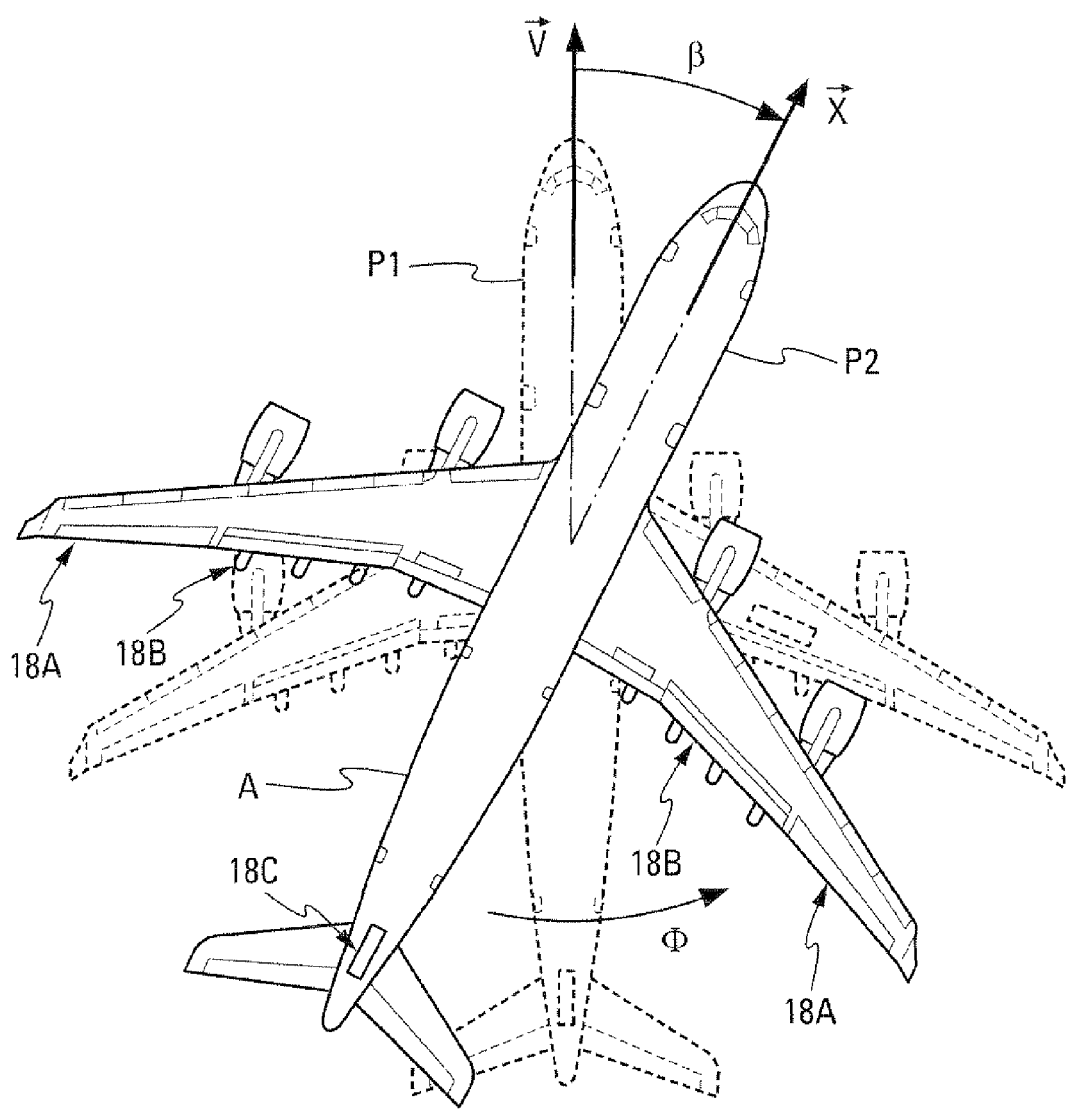
FIG. 2 is a graph for highlighting the effects generated by a lateral dissymmetry, which must be corrected.

FIG. 2 illustrates the effects generated on the lateral behaviour of an aircraft A by a lateral dissymmetry. This FIG. 2 shows the speed vector $\vec{V}$ and the longitudinal axis $\vec{X}$ of the aircraft A and presents:

- a position P1 as appears in normal operation conditions, which is depicted in broken lines; and
- a position P2 in full line, illustrating the position of the aircraft A when a lateral dissymmetry occurs, corresponding to the dynamics of the aircraft A, the latter being restored to position P1 when it is static.

A lateral dissymmetry generally results in the following effects on the behaviour of an aircraft A:

- an angle roll movement Φ, which can be compensated for, usually, by control surfaces of the roll axis (ailerons 18A, spoilers 18B); and
- an angle yaw movement β, which can be compensated for, usually, by control surfaces of the yaw axis (rudder 18C).

Such a dissymmetry is generally compensated for, during a flight, either automatically by an auto-flight device 14 of the aircraft, or manually by the pilot using the control members 15 of the control surfaces. These actions aim at giving some stability to the aircraft A and some comfort for the passengers. The response of the aircraft A to a lateral dissymmetry results therefore in deflections of the control surfaces. Such deflections of control surfaces will generate an additional drag which is proportional to the nature and level of the lateral dissymmetry to be corrected and which leads to an increase of fuel consumption.

The device 1 in accordance with the invention aims at optimising the performance of the aircraft A in such a situation.

For that purpose, according to the invention, said device 1 which is on board the aircraft A includes:

- means 2 for automatically monitoring the aircraft A such that a lateral dissymmetry can be detected;
- a set 3 of information sources, detailed below, which are formed such that flight parameters for the aircraft A, on the one hand, which are likely to be affected by the lateral dissymmetry of the aircraft A and, on the other hand, positions of the control surfaces which are used (usually) for minimising the effects of lateral dissymmetry by generating a null sideslip;
- means 4 for automatically calculating, using said measured flight parameters, aerodynamic coefficients relating to said control surfaces;
- means 5 which are connected through a link 6 to said means 4 and which are formed such that using said calculated aerodynamic coefficients and said measured positions of the control surfaces, an optimum sideslip βop for minimising the overall drag coefficient of the aircraft A can be automatically calculated;
- means 7 which are connected through a link 8 to said means 5 and which are formed such that commands for controlling at least one rudder 18C for generating said optimum sideslip βop, when they are applied to that rudder 18C are automatically determined; and
- means 9 detailed below, which are connected through a link 10 to said means 7 and which are formed such that said commands can be applied automatically to said rudder 18C.

Thus, the device 1 in accordance with the invention determines and applies to the aircraft A, particularly a cargo aircraft, commands for obtaining an optimum sideslip βop which is defined such that the overall drag coefficient of the aircraft A can be minimised. Accordingly, by reducing this overall drag coefficient, the device 1 reduces the instant fuel consumption and therefore increases the performance of the aircraft A. In particular, it increases the security margins in terms of distance accessible to the aircraft A.

According to the invention, said optimum sideslip βop is calculated such that the deflection of control surfaces of the roll axis, mainly the spoilers 18B and optionally the ailerons 18A of the aircraft A is reduced, and even possibly cancelled. Preferably, the sideslip βop enables at least the deflection of the spoilers to be cancelled on the side opposite to the one which is the origin of the dissymmetry. In addition, the roll required for the equilibrium is generated by the rudder 18C which, by known aerodynamic effects, induces roll moments. Since the rudder 18C generates a drag which is less than the control surfaces of roll axis, the device 1 reduces the drag such that the overall drag coefficient of the aircraft A is minimised.

In a particular embodiment, said means 4, 5 and 7 are integrated into a calculation unit 11 which is connected through links 21 and 22 to said means 2 and said set 3 respectively.

Besides, said means 9 include a plurality of usual actuators 17 which are connected to the link 10 and which are formed such that they respectively act on different means 18, as depicted through the links 19 in chain-dotted lines. These means 18, in particular the control surfaces (rudder 18C, ailerons 18A, spoilers 18B) or engines are likely to act on the lateral movement of the aircraft A.

Within the scope of this invention, said means 2 can include any type of usual means on board the aircraft A which are capable of detecting a lateral dissymmetry. In particular, they can include usual means for detecting an engine breakdown and/or usual means for detecting a control surface movement.

Said means 4 calculate the aerodynamic coefficients $C\lambda\delta p$, $C\lambda\delta r$, $C\lambda\delta sp$ detailed below, usually, using the math, centering, speed and altitude of the aircraft A.

Further, said means 5 calculate the optimum sideslip βop using the following expression:

$$\beta op = -(C\lambda\delta p \cdot \delta p + C\lambda\delta r \cdot \delta r + C\lambda\delta sp \cdot \delta sp)/C\lambda\beta$$

wherein:

- δp, δsp and δr are the equilibrium positions of ailerons 18A, spoilers 18B and the rudder 18C respectively of the aircraft A, that is the positions generated usually for compensating for the dissymmetry with a null sideslip. It should be noticed that roll control surfaces, other than ailerons and spoilers, can be contemplated;
- $C\lambda\delta p$, $C\lambda\delta sp$ and $C\lambda\delta r$ are aerodynamic coefficients relating respectively to ailerons 18A, spoilers 18B and the rudder 18C; and
- $C\delta\beta$ is the derivative of the roll moment coefficient with respect to the sideslip.

Besides, said means 7 calculate, using the usual calculation methods, commands to be applied to said means 18 for bringing the aircraft A into a configuration for obtaining said optimum sideslip βop. The optimum sideslip βop is turned into a set point for a closed loop control. By flying with a sideslip βop, the deflection angles δp, δsp and δr are lesser than with a null sideslip, which also contributes to increasing the performance.

In a preferred embodiment, said device 1 is part of a system 12 which is intended to correct the effects of the lateral dissymmetry of an aircraft A. In this preferred embodiment, the device 1 is intended to improve this system 12 for optimising the performance of the aircraft A, particularly in terms of fuel consumption. This system 12 includes usual means 13 which comprise an auto-flight device 14 and/or control members 15, such as control sticks, likely to be actuated by a pilot of the aircraft A. These means 13 are formed so as to generate, upon detection of a lateral dissymmetry of the aircraft A, usually, commands intended for means 9 in order to control means 18 for compensating for aircraft dissymmetry. Usually, these commands generated by means 13 are intended to generate a null sideslip. The device 1 according to the invention aims at improving this system 12 by enabling an optimum sideslip βop as detailed above to be defined and generated, for obtaining the above-mentioned advantages.

In a first embodiment, the device 1 performs a sideslip control (for obtaining the optimum sideslip βop) only with the yaw control surfaces, mainly the rudder 18C.

The equations considered in this invention use the following parameters relating to aircraft A:
- $Cl_x$ are aerodynamic coefficients;
- β is the sideslip;
- p and r are the roll and yaw rates;
- δp and δsp are the deflections of ailerons 18A and spoilers 18B of the aircraft A at equilibrium;
- δr is the deflection of the rudder 18C;
- L is the average aerodynamic chord;
- V is the air speed;
- S is the wing area; and
- ρ is the air density.

It is needed to make the roll moment equation null:

$$L = \frac{1}{2}\rho S l V^2 Cl = 0 \Rightarrow Cl = 0 \qquad \text{Equ. 1}$$

Yet, the roll moment coefficient is written as follows:

$$Cl = Cl\beta \cdot \beta + Clp\frac{pl}{v} + Clr\frac{rl}{v} + Cl\delta p \cdot \delta p + Cl\delta r \cdot \delta r + Cl\delta sp \cdot \delta sp \qquad \text{Equ. 2}$$

Therefore, by coupling equations Eq1 and Eq2, the following is obtained:

$$Cl\beta \cdot \beta + Clp\frac{pl}{v} + Clr\frac{rl}{v} + Cl\delta p \cdot \delta p + Cl\delta r \cdot \delta r + Cl\delta sp \cdot \delta sp = 0$$

At equilibrium, p=r=0, therefore the following is obtained:

$$\beta = \frac{-1}{Cl\beta}(Cl\delta p \cdot \delta p + Cl\delta r \cdot \delta r + Cl\delta sp \cdot \delta sp) \qquad \text{Equ. 3}$$

The optimisation implemented by the device 1 therefore relies on a sideslip control around the optimum value βop obtained by solving the equation Equ. 3.

Said set 3 of information sources includes in particular:
- an ADIRU-type air reference unit, which determines, usually, the roll angle Φ, the roll rate p and the yaw rate r;
- usual means for measuring the positions of the control surfaces 18A, 18B and 18C; and
- usual means for determining, particularly, the mass, centring, speed and altitude of the aircraft A.

Further:
- said means 4 calculate the aerodynamic coefficients through a linear interpolation, using the usual tables, with the help of the mass, centring, speed and altitude of the aircraft, received from said set 3;
- said means 5 calculate said optimum sideslip βop using said aerodynamic coefficients received from said means 4 and equilibrium positions of control surfaces, measured by said set 3. For that purpose, said means 5 use the above-mentioned equation Equ. 3; and
- said means 7 determine, usually, the commands to be applied to the means 9, using the optimum sideslip βop received from said means 5. Said optimum sideslip is turned into a set point for a closed loop control.

Besides, in a second embodiment, the device 1 performs the optimisation by controlling the sideslip by the yaw control surfaces (mainly the rudder 18C) and a dissymmetry thrust of the engines of the aircraft A.

In this second embodiment, the means 7 are formed such that first commands for controlling the rudder 18C and second commands for controlling the thrust of the engines of the aircraft A are determined, said first and second commands being such that they enable said optimum sideslip βop (calculated by means 5) to be generated when they are applied together to the aircraft A. Moreover, means 9 are formed such that said first and second commands are respectively applied to said rudder 18C and said engines.

According to the invention, said means 7 use a thrust optimisation table which indicates, for any sideslip value, an associated thrust value. Said second commands are determined such that the thrust value from said thrust optimisation table is generated, being associated with the optimum sideslip βop (calculated by means 5). By considering the lateral effects generated by these second commands, said means then determine said first commands so as to get the sought lateral movement obtained by the combined actions generated by said first and second commands.

Said thrust optimisation table (which is, for example, recorded in a memory 20 integrated into the means 7) is determined at ground, before the flight, using usual simulations.

In this second embodiment, said means 7 and 9 generate an optimum sideslip with an hybridation between the yaw control surfaces and the differential engine thrusts, while ensuring:
- an overall thrust level equivalent to the usual control thrust;
- limitations of differential engine thrusts in order to avoid vibration phenomena; and
- an optimum fuel consumption.

Using the differential engine thrusts (that is different thrusts on both sides of the aircraft A) enables the deflections of the rudder 18C to be limited, which restraints the effects thereof on the drag and therefore enables the fuel consumption to be further reduced.

The first embodiment above mentioned is in particular suitable for a short term strategy, that is a short time flight, whereas the second embodiment is more particularly adapted to a long-term strategy.

The device 1 in accordance with the invention is therefore an on board device which enables the control of the aircraft A to be optimised in real-time and in the long-term in order to minimise the effect of lateral dissymmetry, in particular in terms of performance. Said device 1 enables to calculate in real-time the optimum behaviour that the aircraft A should have so as to reduce the performance alteration, mainly with respect to fuel consumption. Besides, since the device 1 according to the invention reduces the deflection of control surfaces being used, it also enables to reduce the load applied on the structure in case of a lateral dissymmetry.

The invention claimed is:

1. A process for optimising the performances of an aircraft (A) in the presence of a lateral dissymmetry, during a flight of the aircraft (A), comprising automatically, via a device on-board the aircraft:
   a) monitoring said aircraft (A) such that the lateral dissymmetry can be detected;
   b) when a lateral dissymmetry is detected, measuring flight parameters of the aircraft (A), on the one hand, for calculating aerodynamic coefficients relating to control surfaces (18) of the aircraft (A), and on the other hand, measuring an equilibrium position of said control surfaces (18), said control surfaces (18) being preliminary brought to these positions for minimising effects of the lateral dissymmetry by generating a null sideslip of the aircraft (A);
   c) using said measured flight parameters, aerodynamic coefficients relating to said control surfaces (18) are calculated;
   d) using said thus calculated aerodynamic coefficients and said measured positions of the control surfaces (18), an optimum sideslip $\beta op$ likely to generate a sideslipping for minimising an overall drag coefficient of the aircraft (A) is calculated using the following expression:

$$\beta op = -(C\lambda\delta p1 \cdot \delta p1 + C\lambda\delta r + C\lambda\delta p2 \cdot \delta p2)/C\lambda\beta$$

wherein:
   $\delta p1$ and $\delta p2$ are the equilibrium positions of roll control surfaces (18A, 18B) of the aircraft (A) ;
   $\delta r$ is the equilibrium position of a rudder (18C) of the aircraft (A);
   $C\lambda\delta p1$, $C\lambda\delta p2$ and $C\lambda\delta r$ are the aerodynamic coefficients relating respectively to the roll control surfaces (18A, 18B) and the rudder (18C); and
   $C\lambda\beta$ is the derivative of the roll moment coefficient with respect to the sideslip;
   e) determining commands for controlling at least one rudder (18C) for generating said optimum sideslip $\beta op$, when they are applied to said rudder (18C); and
   f) applying said commands to said rudder (18C).

2. The process according to claim 1, wherein in step e), first commands for controlling the rudder (18C) and second commands for controlling thrust of the engines of the aircraft (A) are determined said first and second commands enabling said optimum sideslip to be generated when they are applied together to the aircraft, and in step b), said first and second commands are respectively applied to said rudder (18C) and to said engines.

3. The process according to claim 2, wherein said second commands are determined using said optimum sideslip and a thrust optimisation table indicative, for any sideslip value, of an associated thrust value, said second commands being determined such as to generate the thrust value from a thrust optimisation, which is associated with said optimum sideslip.

4. The process according to claim 3, wherein said thrust optimisation table is determined in a preliminary step before the flight, using simulations.

5. The process according to claim 1, wherein in step c), said aerodynamic coefficients are calculated using a mass, a centering, a speed, and, an altitude of the aircraft (A).

6. A method for correcting lateral dissymmetry of an aircraft (A), said method comprising a main step of bringing rudders (18) of the aircraft (A) to positions for generating a null sideslip of aircraft (A),
   wherein said main step and the process according to claim 1 is implemented together, said main step being implemented between steps a) and b) of said process.

* * * * *